United States Patent [19]

Fukumoto et al.

[11] Patent Number: 4,805,755

[45] Date of Patent: Feb. 21, 1989

[54] SYNCHRONIZER

[75] Inventors: Takeshi Fukumoto; Kiyoshi Anzai, both of Fujisawa, Japan

[73] Assignee: Isuzu Motors Limited, Shinagawa, Japan

[21] Appl. No.: 115,626

[22] Filed: Oct. 30, 1987

[30] Foreign Application Priority Data

Nov. 14, 1986 [JP] Japan .................................. 61-269800

[51] Int. Cl.⁴ ............................................. F16D 23/08
[52] U.S. Cl. .................................. 192/53 F; 192/67 A
[58] Field of Search ................ 192/53 E, 53 F, 53 G, 192/53 R, 67 A

[56] References Cited

U.S. PATENT DOCUMENTS 3,272,291  9/1966  Flinn ................................... 192/53 F
3,366,208  1/1968  Kelbel .................................. 192/53 F
3,749,215  7/1973  Rommelshausen ............... 192/53 F
4,623,054  11/1986  Barksdale .......................... 192/53 E

FOREIGN PATENT DOCUMENTS 1102991  2/1968  United Kingdom .............. 192/53 F Primary Examiner—Leslie A. Braun
Assistant Examiner—David A. Testardi
Attorney, Agent, or Firm—Browdy & Neimark

[57] ABSTRACT

A synchronizer for transmissions, wherein the surfaces of the recesses, in which the locking claws of an outside ring are fitted, that are formed in a synchromesh cone so as to extend in the circumferential direction thereof are tapered, whereby thrust toward a clutch hub is generated in the outside ring during a synchronizing operation. The outside ring lightly contacts a block ring before a shifting operation is started. One side surface of the outside ring can be brought into close contact with a side surface of the clutch hub by a thrusting action of the outside ring.

3 Claims, 2 Drawing Sheets

SYNCHRONIZER

BACKGROUND OF THE INVENTION

1. Field of the Invention

This invention relates to a synchronizer for transmissions.

2. Description of the Prior Art

In general, a manual transmission for an automobile employs a synchronizer for effecting a speed changing operation easily and speedily. This synchronizer is provided between intermeshing splines formed on a gear in a synchronized unit and a sleeve connected to a synchronizing unit.

An example of a 3-cone type synchronizer made according to the conventional techniques and used in a gear transmission will roughly be described with reference to FIGS. 3 and 4. FIG. 3 is a sectional view of a conventional 3-cone type synchronizer 30 in a gear transmission, and FIG. 4 a sectional view taken along the line IV—IV in FIG. 3. The line III—III in FIG. 4 is the line along which FIG. 3 is taken. A sleeve 1 and a clutch hub 2 are joined to each other slidably via their respective splines 3, 4. The sleeve 1, clutch hub 2 and a block ring 5 are fixed in the rotational direction by an insert key 13, and the claws 14 of the inside ring 7 extend into the recesses in the block ring 5. Accordingly, the sleeve 1, clutch hub 2, block ring 5 and inside ring 7 are fixed with respect to one another in the rotational direction and adapted to rotate at the same number of revolutions per unit time. A first gear 11 or a second gear 12 is spline-connected to a synchromesh cone 18 via splines 21, 29. The synchromesh cone 18 is provided with a plurality of circumferentially-extending cross-sectionally rectangular recesses 27, and the outside ring 6 with a plurality of circumferentially-extending locking claws 24. The synchrocone 18 and outside ring 6 are fixed to each other in the rotational direction by the locking claws 24 engaged with the recesses 27, in such a manner that the synchromesh cone 18 and outside ring 6 are rotated at the same number of revolutions per unit time. The outer tapering surface, i.e. a conical surface 16 of the outside ring 6 contacts the inner tapering surface, i.e. a conical surface of the block ring 5, and the inner tapering surface, i.e. a conical surface 15 of the outside ring 6 the outer tappering surface, i.e. a conical surface 32 of an inside ring 7. When a shifting action of the transmission is carried out, the phases of the sleeve 1 and block ring 5 are matched by the insert key 13, and a dog tooth 35 of the sleeve 1 presses that 34 of the block ring 5 to start a synchronizing operation. This synchronizer has three conical surfaces, i.e. tapering surfaces which have the number of a relative revolution. To be concrete, they are the contact surface 31 of the outer tapering surface 31 of the outside ring 6 and inner tapering surface 16 of the block ring 5, contact surface 32 of the inner tapering surface 32 of the outside ring 6 and outer tapering surface 15 of the inside ring 7, and contact surface 33 of the inner tapering surface of the inside ring 7 and outer tapering surface of the synchrocone 18. Reference numeral 9 in the drawing denotes key springs.

The above-described 3-cone type synchronizer 30 in a transmission has three conical surfaces, i.e. three mutually contacting tapering surfaces, and there is a limit to the accuracy of each tapering surface, so that the play, i.e. inclination of the block ring 5 with respect to the synchromesh cone 18 increases. Consequently, it becomes difficult to generate a stable cone torque when the synchronizer is operated. In order to connect three members, in other words, in order to connect the block ring 5, outside ring 6, inside ring 7 and synchrocone 18 together properly, it is necessary that these members be formed so as to provide suitable clearances between these members and between the locking claws and recesses. Due to these clearances, play in the rotational direction occurs between these members. Moreover, the generation of cone torque tends to delay due to the limited accuracy of the conical surfaces. The condition of engagement of the locking claws 24 of the outside ring 6 with the synchromesh cone 18 is as shown in FIG. 4. Namely, while the outside ring 6 and synchromesh cone 18 are rotated relatively to each other, a leading end portion 28 of a locking claw 24 and a circumferentially inner surface 26 of a recess 27 in the synchromesh cone 18 are engaged with each other. Consequently, the inclination of the outside ring 6 is prevented, and the outside ring 6 comes near the block ring 5, so that the locking claw 24 and synchromesh cone 18 contact each other reliably. However, since no axial thrust works on the locking claw 24 of the outside ring 6, a clearance 20 is left between the outside ring 6 and clutch hub 2. Therefore, the outside ring 6 is readily inclined when a shifting operation is carried out.

Japanese Patent Publication No. 17642/1971 (U.S. Pat. No. 3,414,098) discloses a synchronizer structure shown in FIG. 5. In this synchronizer structure 50, a ring 59 is provided between a gear 53 and a clutch drum 58, and has clutch surfaces 60, 61 engageable with clutch surfaces 56, 67. A clutch drum 58 is provided with teeth 62 which are drive-engaged reliably with a clutch sleeve 54 when the clutch sleeve 54 is displaced axially. The clutch drum 58 is drive-engaged reliably with the clutch sleeve 54 and gear 53. The ring 59 has a plurality of projecting portions 63, and a torque transmission hub 51 a plurality of radially-extending recesses 64, the projecting portions 63 being engaged with the recesses 64 to attain the driving engagement of the ring 59 with the torque transmission hub 51. This synchronizer structure 50 is operated as follows. When the clutch sleeve 54 is displaced axially, a synchronizer ring 52 and ring 59 frictionally engage the clutch surfaces 55, 56 of the clutch drum 58 to enable the gear 53 and torque transmission hub 51 to be reliably drive-engaged. This synchronizer structure 50 also has problems similar to those with the above-described 3-cone type synchronizer. Namely, although the recesses 64 in the torque transmission hub 51 and the projecting portions 63 of the ring 59 are engaged, thrust causing the ring 59 to impinge upon the torque transmission hub 51 does not occur. Therefore, it is clear that the construction of the synchronizer structure is incapable of preventing the synchronizer ring 52 and clutch drum 58 from being inclined when a shifting operation is carried out.

SUMMARY OF THE INVENTION

A primary object of the present invention is to solve these problems, and provide a synchronizer capable of improving the oil throwing effect when a shifting operation is carried out, by bringing the outside ring into press-contact with the clutch hub and block ring; obtaining stable cone torque when a shifting operation is carried out, by eliminating the clearances among the members so as to prevent the occurrence of play, i.e.

inclination of a rotary member; and reducing a peak load generated by a shifting operation.

Another object of the present invention is t provide a synchronizer constructed by forming circumferentially-extending recesses in a synchrocone into which the locking claws of an outside ring extend, in such a manner that the surface of each recess is tapered, whereby thrust toward the clutch hub is generated in the outside ring.

Still another object of the present invention is to provide a synchronizer characterized in that the outside ring lightly contacts the block ring before a shifting operation is started, to improve the oil throwing effect during this time and obtain more stable cone torque when a shifting operation is carried out.

A further object of the present invention is to provide a synchronizer characterized in that the outside ring closely contacts the clutch hub through a thrusting action.

A further object of the present invention is to provide a synchronizer characterized in that, after the locking claws of the outside ring have contacted the recesses in the synchromesh cone, the outside ring receives thrust in the axial direction to move slidingly along the tapering surfaces of the recesses and engage the clutch hub, a side surface of the outside ring then engaging that of the clutch hub, the outside ring and clutch hub thus contacting each other closely with no clearance left therebetween, this preventing the occurrence of play between the outside ring and clutch hub, i.e. the inclination thereof, the inclination of the outside ring hardly occurring when a shifting operation is carried out, play in the rotational direction of the outside ring also hardly occurring.

A further object of the present invention is to provide a synchronizer characterized in that the outer circumferential conical surface of the outside ring engages the inner circumferential conical surface of the block ring to produce a frictional force therebetween, so that play in the rotational direction of the outside ring, i.e. the inclination thereof hardly occurs.

A further object of the present invention is to provide a synchronizer characterized in that a peak load generated by transmission shifting operation can be reduced since the shifting of the transmission is performed against the thrust occurring on the tapering surfaces.

A further object of the present invention is to provide a synchronizer requiring a simple construction modification and capable of being formed easily by merely providing the recesses in the synchromesh cone in an existing 3-cone type synchronizer with tapering surfaces, this requiring a low manufacturing cost and the easy to perform maintenance of the synchronizer.

DETAILED DESCRIPTION OF THE PREFERRED EMBODIMENT

Figure 1:
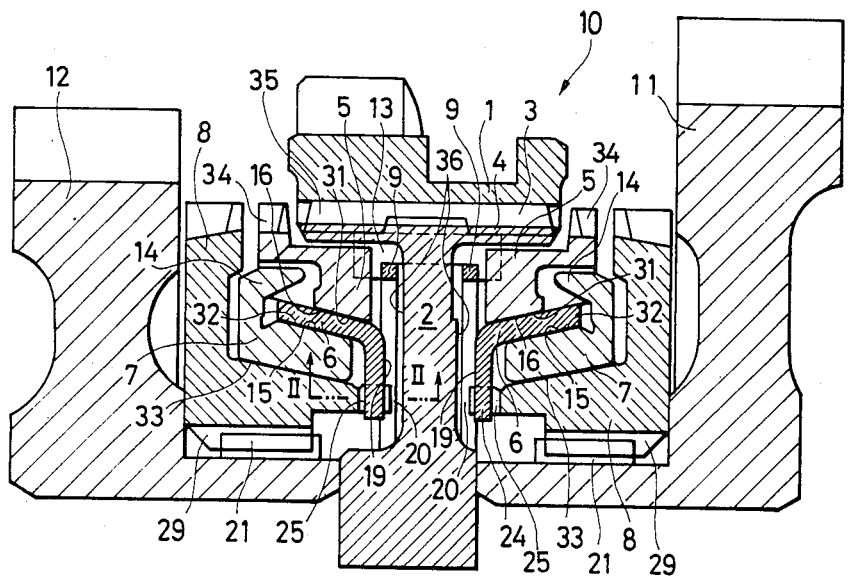
FIG. 1 is a sectional view of an embodiment of the synchronizer according to the present invention.
Figure 2A:
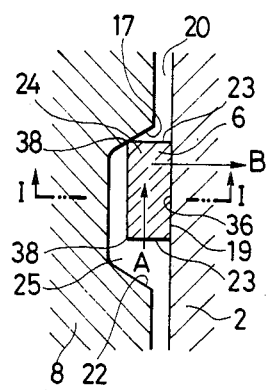
FIG. 2a is a sectional view taken along the line II—II in FIG. 1 and showing an example of the relation between a synchrocone, an outside ring and a clutch hub.
Figure 2B:
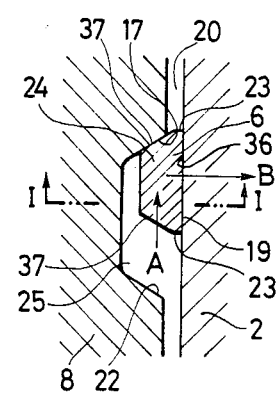
FIG. 2b is a sectional view taken along the line II—II in FIG. 1 and showing another example of the relation between a synchrocone, an outside ring and a clutch hub.
Figure 4:
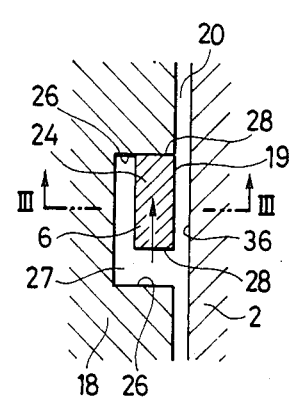
FIG. 4 is a sectional view taken along the line IV—IV in FIG. 3.
Figure 3:
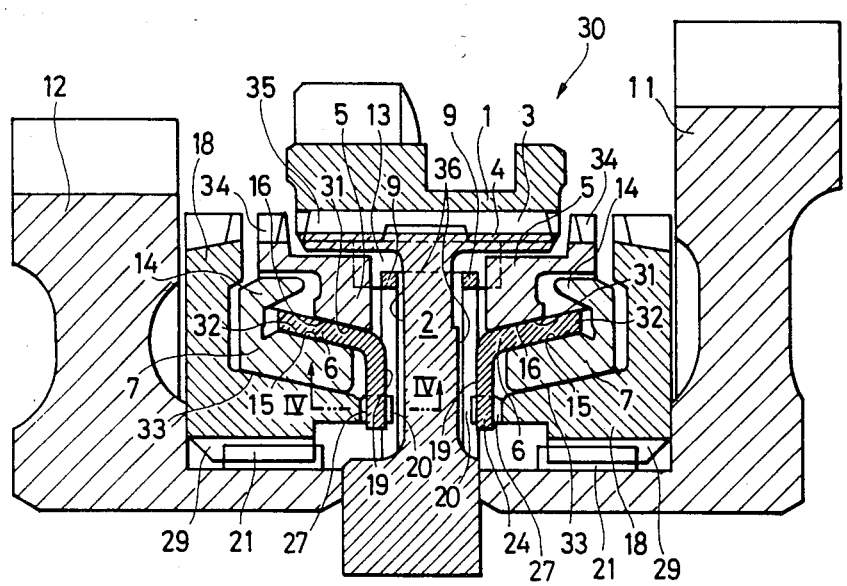
FIG. 3 is a sectional view of a prior art synchronizer.
Figure 5:
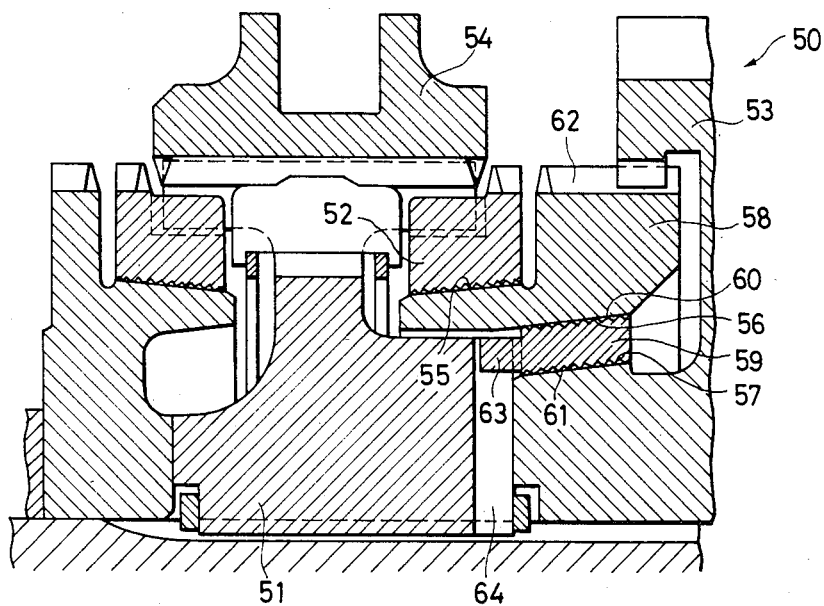
FIG. 5 is a sectional view of a conventional synchronizer.

An embodiment of the synchronizer according to the present invention will now be described with reference to the drawings. FIG. 1 is a sectional view of an embodiment of a 3-cone type synchronizer in a gear transmission according to the present invention. FIGS. 2a and 2b are sectional views taken along the line II—II in FIG. 1. The lines I—I in FIGS. 2a and 2b are the lines along which FIG. 1 is taken. This synchronizer 10 has the same construction as a synchronizer 30 of FIG. 3 except for the shape of the recesses in a synchromesh cone. Therefore, the parts of the synchronizer 10 which are identical with those of the synchronizer 30 are designated by the same reference numerals, and the descriptions of such parts are omitted. Referring to FIG. 1, the recesses 25 in the left and right synchromesh cones 8 have the same construction, though they face in different directions. Accordingly, only a recess 25 in the left synchrocone 8 will be described. Only one of a plurality of recesses 25 formed in the circumferential direction of the synchromesh cone 8 is shown in FIGS. 2a and 2b to meet the convenience of describing the recesses 25. These recesses 25 have tapering surfaces 17, 22 inclined in the rotational direction. A clearance 20 is formed between the synchromesh cone 8 and a clutch hub 2, and also between an outside ring 6 and clutch hub 2. This clearance exists when the shafts of the transmission are not rotated. When these shafts are rotated, the conical surfaces are brought into slide contact with each other, so that the conical surfaces closely contact with no play left therebetween, a shifting operation being then started. When relative rotation occurs, for example, in the direction of an arrow A between the outside ring 6 and synchrocone 8 in this arrangement before a shifting operation is started, a corner portion 38 (refer to FIG. 2a) or a tapering surface 37 (refer to FIG. 2b) of a leading end section 23 of a locking claw 24 of the outside ring 6 engages the tapering surface 17 of the synchromesh cone 8 due to the frictional force occurring on the conical surfaces, i.e. the contact surfaces 31, 32, 33 of the block ring 5, outside ring 6, inside ring 7 and synchromesh cone 8. The locking claw 24 of the outside ring 6 is pressed against the tapering surface 17, so that the outside ring 6 receives thrust in the direction of an arrow B. Consequently, the locking claw 24 is moved slidingly along the tapering surface 17, and a side surface 19 of the outside ring 6 engages a side surface 36 of the clutch hub 2. Namely, the side surface 19 of the outside ring 6 is pressed against the side surface 36 of the clutch hub 2 due to the thrust occurring in the outside ring 6 to fill the clearance between the outside ring 6 and clutch 2 with the conical surface 15 of the outside ring 6 pressed against the block ring 5. This condition shows that preparations for starting a synchronizing operation have been made. A synchronizing operation is started by carrying out a shifting operation to press the sleeve 1 against the block ring 5. In other words, it can be said that the tapering surfaces 17, 22 formed on the synchromesh cone 8 and inclined in the rotational direction will fulfill the functions of making preparations for starting a synchronizing operation.

What is claimed is:

1. A synchronizer comprising:
   a clutch hub capable of transmitting torque;

a sleeve which is coupled to the outer periphery of said clutch hub to drive it, and is allowed to move in the axial direction thereof;

a block ring which rotates in engagement with said clutch hub, and is allowed to move in the axial direction thereof, and said block ring having dog teeth formed on an outer periphery thereof to engage with said sleeve to drive it, and further having a frictionally coupled tapering surface formed in the inner periphery thereof;

a rotatable synchromesh cone which is arranged on the side of said clutch hub, and has a frictionally coupled tapering surface formed along an outer periphery thereof and dog teeth capable of engaging with said sleeve to drive it, and further has a plurality of recesses formed in the peripheral end surface opposed to said clutch hub; said recesses being opened toward a side surface of said clutch hub and having tapered surfaces that are tilted so that said recesses expand circumferentially toward the side surface of said clutch hub.

an inside ring which has an inner tapering surface formed on the inner periphery thereof and an outer tapering surface formed on the outer periphery thereof, said inner tapering surface being in frictional contact with said frictionally coupled tapering surface of said synchromesh cone; and an outside ring capable of moving in the axial direction thereof having an outer tapering surface that can be brought into frictional contact with said frictionally coupled tapering surface of said block ring and an inner tapering surface that can be brought into frictional contact with said outer tapering surface of said inside ring, and further having a side surface that extends inwardly in the radial direction to oppose the side surface of said clutch hub as well as locking claws that are inserted in said recesses of said synchromesh cone at the end of said side surface of said outside ring to come into slide contact with said tapered surfaces of said recesses.

2. A synchronizer according to claim 1, wherein the side surface of said outside ring can closely contact the side surface of said clutch hub through a thrusting action of said outside ring.

3. A synchronizer according to claim 1, wherein circumferential end surfaces of said locking claws of said outside ring are tapered so as to contact said tapered surfaces of said recesses.

* * * * *